(12) United States Patent
D'Souza et al.

(10) Patent No.: US 12,451,798 B2
(45) Date of Patent: Oct. 21, 2025

(54) MANAGING OVER-CURRENT CONDITION IN A SWITCHING CONVERTER

(71) Applicant: Shaoxing Yuanfang Semiconductor Co., Ltd., Shaoxing (CN)

(72) Inventors: Arnold J D'Souza, Bangalore (IN); Shyam Somayajula, Bangalore (IN)

(73) Assignee: Shaoxing Yuanfang Semiconductor Co., Ltd., Zhejiang (CN)

( * ) Notice: Subject to any disclaimer, the term of this patent is extended or adjusted under 35 U.S.C. 154(b) by 387 days.

(21) Appl. No.: 18/169,233

(22) Filed: Feb. 15, 2023

(65) Prior Publication Data

US 2024/0128854 A1    Apr. 18, 2024

(30) Foreign Application Priority Data

Oct. 14, 2022   (IN) .............................. 202241058831

(51) Int. Cl.
*H02M 1/32* (2007.01)
*H02M 1/08* (2006.01)
*H02M 3/155* (2006.01)

(52) U.S. Cl.
CPC .............. *H02M 1/32* (2013.01); *H02M 1/08* (2013.01); *H02M 3/155* (2013.01)

(58) Field of Classification Search
CPC .......... H02M 1/32; H02M 1/08; H02M 3/155; H02M 1/0009; H02M 3/1588
See application file for complete search history.

(56) References Cited

U.S. PATENT DOCUMENTS

| 7,782,638 B2 | 8/2010 | Murata |
| 8,027,178 B1 | 9/2011 | Chia |

(Continued)

FOREIGN PATENT DOCUMENTS

| CN | 112600168 A | 4/2021 |
| CN | 113328634 A | 8/2021 |
| JP | 2014150675 A | 8/2014 |

OTHER PUBLICATIONS

Shreyas Dmello, Adjustable Current Limit of Smart Power Switches, Jan. 2019, 20 pages, Dallas, Texas.

(Continued)

*Primary Examiner* — Kyle J Moody
(74) *Attorney, Agent, or Firm* — IPHORIZONS PLLC; Narendra Reddy Thappeta

(57) ABSTRACT

A switching converter provides an output voltage, and includes a first switch, a gate driver and an over-current management block. The gate driver is operable to drive the first switch with an ON duration of a first magnitude normally to provide the output voltage. The ON duration corresponds to a first phase of each cycle of a sequence of cycles of a periodic clock signal employed in the switching converter. The over-current management block is operable to determine a potential over-current condition when the switch operates with an ON duration of a first magnitude. In response to the determination, the over-current management block is operable to cause the gate driver to increase an ON duration of the first switch to a second magnitude, and examine a magnitude of current through the first switch with ON duration of the second magnitude to determine whether actual over-current condition is present.

20 Claims, 12 Drawing Sheets

(56) References Cited

U.S. PATENT DOCUMENTS

| | | | | |
|---|---|---|---|---|
| 8,610,492 | B2* | 12/2013 | Prabhu | H02M 3/07 |
| | | | | 327/535 |
| 12,176,808 | B2* | 12/2024 | D'Souza | H02M 3/1584 |
| 2012/0217946 | A1* | 8/2012 | Ju | H02M 3/156 |
| | | | | 323/285 |
| 2013/0336029 | A1 | 12/2013 | Cao | |
| 2015/0288166 | A1 | 10/2015 | Chen | |
| 2017/0093281 | A1* | 3/2017 | Kim | H02M 3/158 |
| 2024/0128852 | A1* | 4/2024 | D'Souza | H02M 1/088 |

OTHER PUBLICATIONS

Angyuan Wang, Predictive over-current protection scheme for step-down DC-DC converter with emulated current mode control, Jul. 1, 2016, 02 pages, vol. 52.

Arthur Huang, et al, Ways to Protect Your Power Path, Apr. 2019, 62 pages, Dallas, Texas.

* cited by examiner

MANAGING OVER-CURRENT CONDITION IN A SWITCHING CONVERTER

PRIORITY CLAIM

The instant patent application is related to and claims priority from the co-pending India provisional patent application entitled, "Ton pulse extension", Serial No.: 202241058831, Filed: 14 Oct. 2022, which is incorporated in its entirety herewith to the extent not inconsistent with the description herein.

BACKGROUND

Technical Field

Embodiments of the present disclosure relate generally to switching converters, and more specifically to managing over-current condition in a switching converter.

Related Art

Switching converters refer to components which convert an input AC (alternating current) or DC (direct current) voltage of one magnitude to an output regulated DC voltage of a desired magnitude by employing and operating switch(es), as is well known in the relevant arts. Switching converters find use as stand-alone power supplies, in voltage regulator modules, etc., used in several environments such as laptops, mobile phones, etc.

Switching converters may be standalone components or be part of a larger system such as a Voltage Regulation Module (VRM). When implemented as part of a VRM, a switching converter may be implemented as separate components, for example, as a Smart Power Stage (SPS) and a controller (or portion thereof), as is also well known in the relevant arts.

Switching converters (and SPS) are implemented based on switches. For example, a switching converter may employ a pair of transistors referred to as high-side (HS) switch and low-side (LS) switch coupled in series, as is well known in the relevant arts.

Over-current conditions may be encountered in switching converters. The term over-current refers to a condition in the switching converter when the current drawn by the switching converter and/or a load powered by, or connected to, the switching converter exceeds a maximum safe limit.

Some examples resulting in an over-current condition are faults in the circuitry within a switching converter (for example, a short-circuited capacitor at the output terminal) and the load becoming a short circuit. Over-current conditions require detection and possible remedial measures (in general, management) to prevent or mitigate damage to the switching converter and/or load.

Aspects of the present disclosure are directed to managing over-currents in a switching converter.

BRIEF DESCRIPTION OF THE VIEWS OF DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Figure 1:
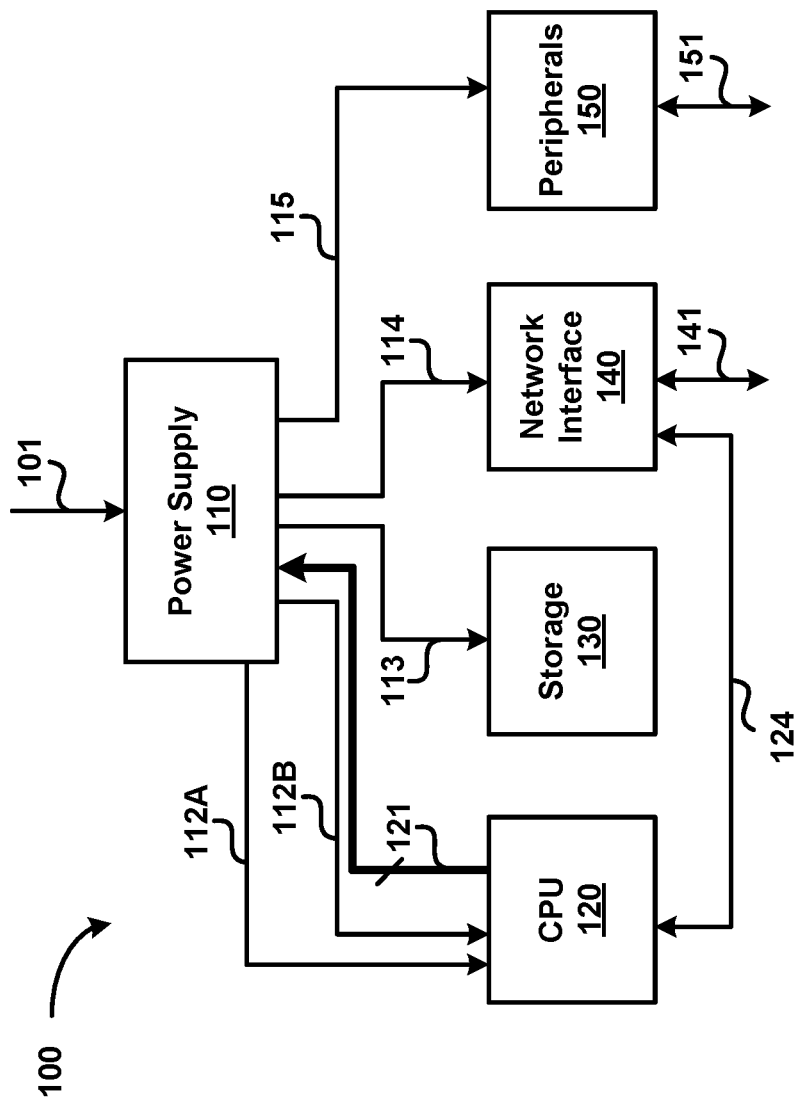
FIG. 1 is a block diagram of an example system in which several aspects of the present disclosure can be implemented.

A switching converter provided according to an aspect of the present disclosure includes a first switch, a gate driver and an over-current management block. The gate driver is operable to drive the first switch with an ON duration of a first magnitude normally to provide a desired output voltage. The ON duration corresponds to a first phase (high logic level in an embodiment) of each cycle of a sequence of cycles of a periodic clock signal employed in the switching converter. The over-current management block is operable to determine a potential over-current condition during the low period of the periodic clock signal.

In response to the determination, the over-current management block increases an ON duration (duration of high logic level) of the first switch to a second magnitude, and examines a magnitude of current through the first switch with ON duration of the second magnitude to determine whether actual over-current condition is present.

According to another aspect, the first switch is a high-side switch provided in series with a low-side switch at a node from which load-current is drawn. The gate driver drives the low-side switch to be ON in a second phase (low logic level)

of each cycle of the sequence of cycles. The actual overcurrent condition corresponds to a condition when the load-current exceeds a safe limit.

In an embodiment, the over-current management block concludes that a potential overcurrent condition exists if either a current flowing through the low-side switch exceeds a first current threshold or an OFF-duration of said high-side switch (i.e., ON duration of the low-side switch) is less than a second threshold duration.

If actual over-current condition is determined to be present, appropriate remedial action such as switching off at least the high-side switch is performed. If actual over-current condition is thereafter determined not to be present, the high-side switch may again be driven with the ON duration equaling the first magnitude.

Due to the longer duration of second phase (low period) in the normal operation, the potential overcurrent condition can be detected reliably. Thereafter, as the current through the high side switch is a more reliable indicator of the actual overcurrent condition, and due to the enhanced duration for the first phase (high period), the actual overcurrent condition also is reliably detected.

In an embodiment of the present disclosure, the overcurrent management block performs the examination of the current magnitude and determination of an actual overcurrent condition in a single cycle of the periodic clock with the ON duration equaling the second magnitude. The overcurrent management block is operable to cause the gate driver to switch off the high-side switch if an actual overcurrent condition is determined to be present.

Several aspects of the present disclosure are described below with reference to examples for illustration. However, one skilled in the relevant art will recognize that the disclosure can be practiced without one or more of the specific details or with other methods, components, materials and so forth. In other instances, well known structures, materials, or operations are not shown in detail to avoid obscuring the features of the disclosure. Furthermore, the features/aspects described can be practiced in various combinations, though only some of the combinations are described herein for conciseness.

2. Example System

FIG. 1 is a block diagram of an example system in which several aspects of the present disclosure can be implemented. System 100 is shown containing power supply 110, central processing unit (CPU) 120, storage 130, network interface 140 and peripherals 150. In an embodiment, system 100 corresponds to a computer (desktop, laptop, etc.), although system 100 can represent other types of systems in other embodiments. It is understood that system 100 can contain more or fewer blocks than those shown in FIG. 1.

CPU 120, in general, represents a processor or a system-on-chip (SoC), and is shown as receiving a pair of supply voltages (Va and Vb) on respective paths 112A and 112B from power supply 110. As an example, Va may be a smaller voltage than Vb, and may be used to power a core portion of CPU which may include arithmetic logic unit (ALU), microprogram sequencer, registers, etc. Vb may be used to power the rest of CPU 120, such as for example, input/output (I/O) units, I/O buffers, on-chip peripherals etc. CPU 120 provides various signals (all deemed to be contained in path 121) specifying, among others, its power supply requirements to power supply 110. Examples of such signals can be those that specify the specific mode of operation (in terms of power consumption) such as PS1, PS2, PS3, etc., which refer to "Power Save States for Improved Efficiency".

Storage 130 represents a memory that may include both volatile and non-volatile memories. For example, in a personal computer, storage can include magnetic memory (hard disk) as well as solid state memory (RAM, Flash, etc.). Storage 130 is shown receiving a supply voltage on path 113 for powering various circuits and blocks within.

Network interface 140 operates to provided two-way communication between system 100 and a computer network, or in general internet. Network controller 140 implements the electronic circuitry required to communicate using a specific physical layer and data link layer standard such as Ethernet or Wi-Fi™. Network interface 140 may also contain a network protocol stack to allow communication with other computers on a same local area network (LAN) and large-scale network communications through routable protocols, such as Internet Protocol (IP). Network interface 140 receives a power supply on path 114 for powering internal circuits and blocks. Network interface 140 communicates with external systems and CPU 120 on path 141 and path 124 respectively.

Peripherals 150 represents one or more peripheral circuits, such as for example, speakers, microphones, user interface devices, etc. Peripherals 150 receives a power supply on path 115, and communicates with external devices on path 151.

Power supply 110 receives one or more sources of power (e.g., battery) on path 101, and operates to provide the desired power supply voltages on paths 112A, 112B, 113, 114 and 115. In an embodiment, power supply 110 is designed to contain one or more DC-DC converters within to generate the power supply voltages. Power supply 110 responds to signals from CPU 120 received on path 121 to reduce/increase current output based on the specific signal (e.g., PS1, PS2 and PS3).

In an embodiment, power supply 110 is a voltage regulator module (VRM), sometimes also called processor power module (PPM), and contains one or more step-down switching (buck) converters to generate several smaller voltages from a higher-voltage supply source. In other embodiments however, other types of DC-DC converters such as boost, buck-boost, hysteretic converters etc., can be implemented instead of a buck converter. With a VRM, multiple devices/ICs requiring different supply voltages can be mounted on the same platform, for example, a computer motherboard of a personal computer (PC). Accordingly, the description is continued with respect to a VRM as shown in FIG. 2.

3. Voltage Regulator Module

Figure 2:
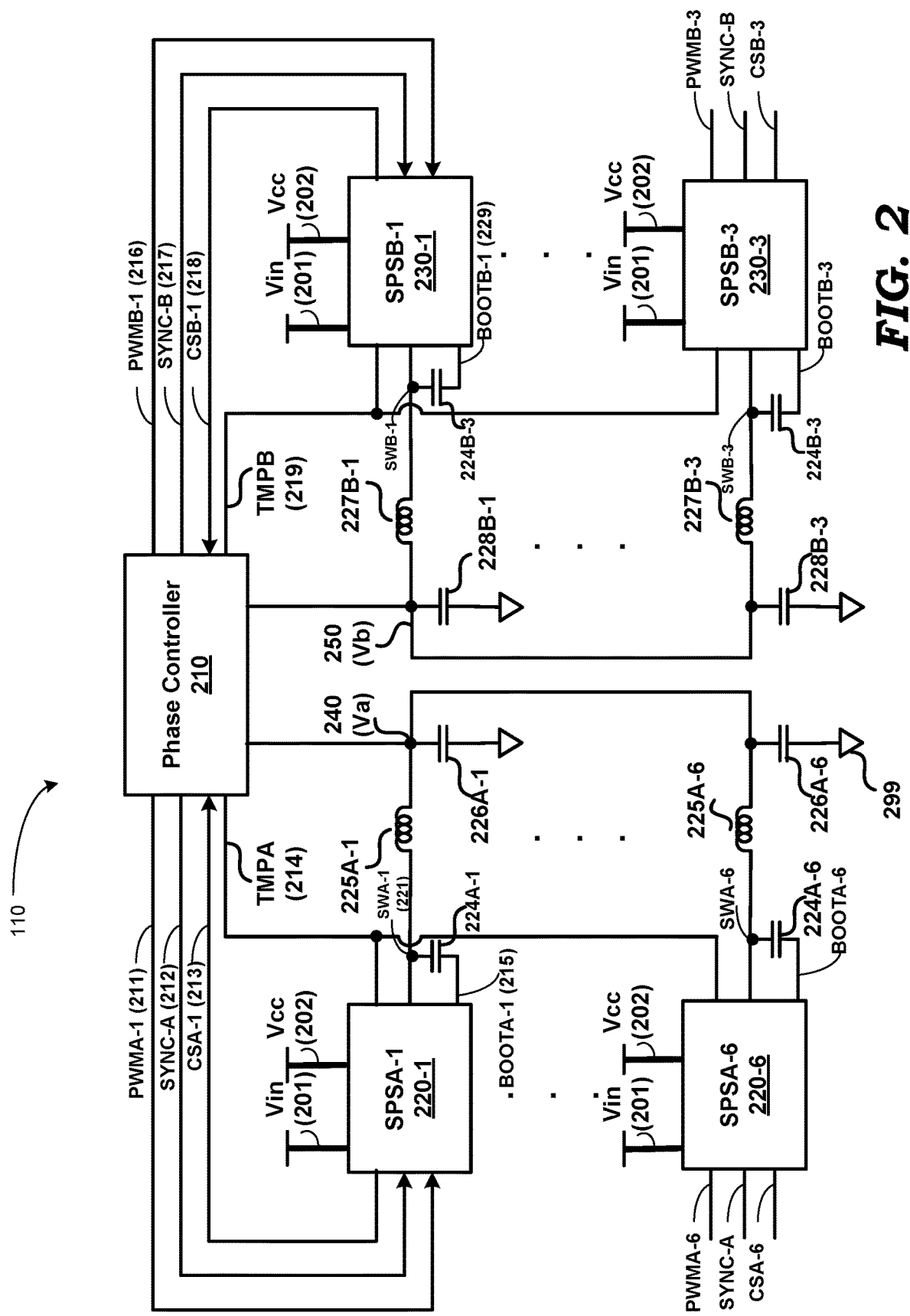
FIG. 2 is a block diagram illustrating the details of a Voltage Regulator Module (VRM) in an embodiment of the present disclosure.

FIG. 2 is a block diagram illustrating the details of a Voltage Regulator Module (VRM) in an embodiment of the present disclosure. Power supply 110 is implemented as a VRM and is shown containing phase controller 210, smart power stages (SPS) SPSA-1 (220-1) through SPSA-6 (220-6), SPSB-1 (230-1) through SPSB-3 (230-3), inductors 225A-1 through 225A-6, 227B-1 through 227B-3, output capacitors 226A-1 through 226A-6, 228B-1 through 228B-3, and bootstrap capacitors 224A-1 through 224A-6, 224B-1 through 224B-3. Each bootstrap capacitor associated with an SPS is shown connected between respective nodes SW and BOOT of the corresponding SPS. Thus, bootstrap capacitor 224A-1 is shown connected between node SWA-1 (221) and BOOTA-1 (215). Although bootstrap capacitor is shown connected external to each SPS, in alternative embodiments, bootstrap capacitor may be internal to the SPS.

Power supply Va (240) is generated by a 6-phase buck converter (there are six SPSes—220-1 through 220-6), while power supply Vb (250) is generated by a 3-phase buck converter (there are three SPSes—230-1 through 230-3). Nodes/Paths 240 and 250 correspond to paths 112A and 112B respectively of FIG. 1. In the interest of conciseness, other power supply circuits that generate supplies on paths 113, 114 and 115 are not shown in FIG. 2.

Phase controller 210 performs regulating functions to enable the generation of regulated voltages Va and Vb. Accordingly, Va and Vb are shown as being provided as inputs to phase controller 210, to enable operation of one or more feedback loops within phase controller 210 to regulate Va and Vb. Phase controller 210 also receives inductor-current information (current flowing through each of the inductors) from each of the SPSes to enable various operations such as current-mode control of voltage regulation, current limiting, short circuit protection, and balancing the currents generated by each SPS of a same converter so as to make the currents from each SPS of a converter to be substantially equal in magnitude.

The combination of (corresponding circuitry within) phase controller 210, an SPS, an inductor and a capacitor forms one "phase" of each multi-phase buck converter. Thus, for example, SPSA-1, inductor 225A-1, capacitor 226A-1, and the corresponding portion within phase controller 210 form a single buck converter, and one phase of the 6-phase buck converter. It is noted here that, while each phase is shown as having its own separate capacitor (e.g., 226A-1), in another embodiment, only a single larger capacitor (larger capacitance) may be employed at node 240 (as well as 250). In other embodiments, multiple capacitors are placed close to the load powered by the corresponding supply voltage.

It may be appreciated that the combination of phase controller 210 and one set of SPSes along with the external inductor, capacitor, etc., operates as a switching converter to provide a regulated output voltage. The term 'switching converter' as used herein includes a stand-alone switching converter (i.e., a non-multi-phase converter), a switching converter of a multi-phase voltage regulator or multi-phase regulator module having several independent switching converters, and also a portion of a switching converter, such as for example a smart power stage (SPS).

Each SPS may be implemented to contain a high-side switch, a low-side switch, gate-drive circuitry for the two switches, current-sense block and other circuits (not shown). An example of such 'other circuits' includes, but is not limited to, a temperature-monitor circuit to measure temperature of the SPS and to provide the temperature to phase controller 210. The current-sense block of an SPS measures/senses and/or estimates the magnitude of inductor-current through the inductor of that phase, and provides such inductor-current information to phase-controller 210.

As is well-known in the relevant arts, the inductor-current of a phase/SPS is indicative of (and proportional to) the current drawn from the output terminal of that phase. The current drawn from a phase/SPS includes load-current. For example, the inductor-current through inductor 225A-1 is indicative of the load-current drawn by one or more loads (not shown) powered by regulated voltage 240 (Va). Additionally, the current drawn from the output terminals of a phase can include charging current of one or more output capacitors (such as 226A-1) and current due to fault-conditions such as a short-circuited output capacitor.

Each SPS receives a source of power as an input which is connected to the high-side switch (shown in detail in sections below). In FIG. 2, the supply source is numbered 201, and has a voltage Vin. Typical value of Vin in a VRM is about 21 volts (V). Each SPS is also shown as receiving bias voltage Vcc on path 202. Typical value of Vcc in a VRM is about 3.3 V, and Vcc is a regulated voltage and may be provided by a voltage regulator (not shown, but which may be separate from the switching regulators and SPSes of FIG. 2) or from a source external to the VRM.

Each SPS communicates with phase controller 210 via corresponding signals PWM, SYNC, CS and TMP. Thus, SPSA-1 is shown connected to phase controller 210 through signal/paths PWMA-1 (211), SYNC-A (212), CSA-1 (213) and TMPA (214). SPSA-6 communicates with phase controller 210 via signals PWMA-6, SYNC-A, CSA-6 and TMP (214). Similarly, SPSB-1 is shown connected to phase controller 210 through signal/paths PWMB-1 (216), SYNC-B (217), CSB-1 (218) and TMPB (219). SPSB-3 communicates with phase controller 210 via signals PWMB-3, SYNC-B, CSB-3 and TMP (219). The other SPSes would have similar connections with phase controller 210.

Signal PWM is an input to an SPS and is a pulse-width modulated (PWM) signal. Signal PWM is a fixed-frequency, variable duty-cycle signal, although its frequency frequency is potentially modifiable by phase controller 210 based various operating considerations. A cycle/period of signal PWM consists of a first interval in which only the high-side (HS) switch of SPS is ON, and a second interval in which only the low-side (LS) switch of the SPS is ON. The PWM signal controls the opening and closing of high-side switch and low-side switch of the SPS. The duty cycle of the PWM signal is set by phase controller 210 and is designed to generate the desired power supply voltage and/or control/change the current supplied by that phase. For example, PWMA-1 would have a duty cycle as required for the magnitude of Va and the current to be provided by SPSA-1. As is well known in the relevant arts, the PWM signals to each SPS of a same multi-phase converter are staggered, i.e., delayed with respect to each other in phase such that typically no two high-side switches or low-side switches in the converter (i.e., respective SPSes) will be overlapping. Such a technique is employed for reasons such as, for example, to ensure that the peak instantaneous current drawing from Vin is relatively low (or zero) at all times.

In an embodiment, signal PWM represents tri-state input from phase controller 210. When logic LOW is detected by the SPS on signal PWM, the low-side switch is turned ON, and when logic HIGH is detected on signal PWM, the high-side switch is turned ON. A high-impedance (hi-Z) value on signal PWM is designed to turn OFF both the high-side and the low-side switches of the corresponding SPS. When an SPS is powered-up, a high-impedance (hi-Z) value is received on signal PWM for a certain duration before PWM starts to transition between the logic HIGH and logic LOW states noted above. An "initial transition" of signal PWM during power-up may therefore be regarded as transition from the hi-Z state to either HIGH state or LOW state.

Signal TMP is an output from an SPS to phase controller 210, and provides information regarding the temperature in the SPS. Phase controller 210 may process the TMP signal (or the information contained in it) to adjust the current supplied by that phase, or for shut-down of the VRM. The TMP outputs of each phase of a converter are wired together, and a single input is connected to phase controller 210.

Signal SYNC is an input to an SPS and may be used by phase controller 210 for the purposes of waking-up the SPS upon power-up of the power supply 110, and also to indicate the power-mode (e.g., PS2, PS3), i.e., output current requirement, of the multi-phase converter. Typically, all SPSes of the same converter share a single SYNC signal. Signal SYNC is received before signal PWM starts to transition between logic HIGH and logic LOW states.

Signal CS (current sense) is an input to phase controller 210 from an SPS, and contains information regarding the magnitude of the inductor-current of that phase/SPS. The information can be in the form of a current, voltage, digital values, etc.

Each SPS is shown associated with a corresponding bootstrap capacitor to drive the high-side switch in the SPS. The implementation details of a prior SPS and are described next.

4. Prior Smart Power Stage (SPS)

Figure 3A:
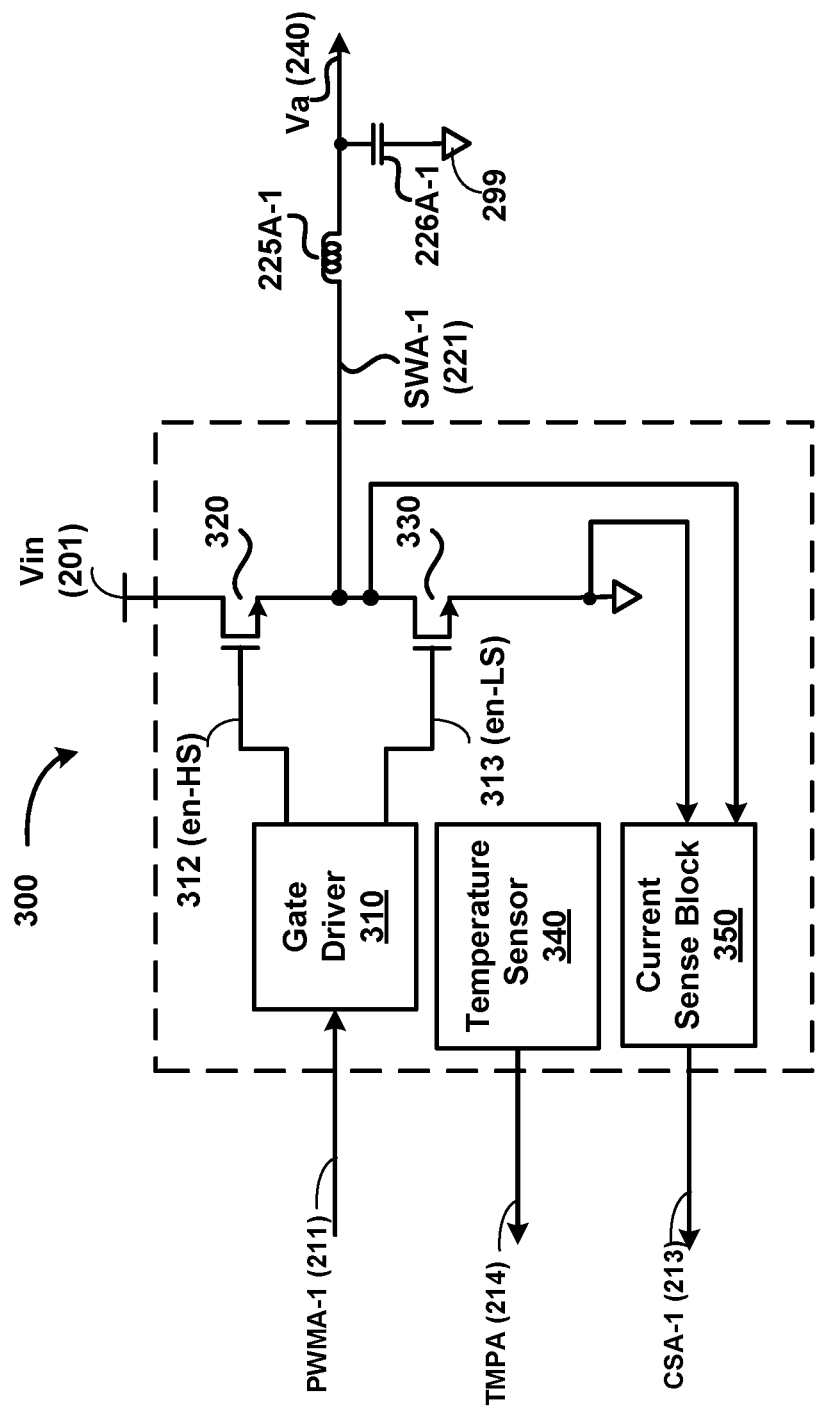
FIG. 3A is a diagram illustrating the implementation of a prior smart power stage (SPS).

FIG. 3A is a diagram illustrating the implementation of a prior SPS. SPSA-1 (220-1) is shown in detail in FIG. 3A. The other SPSes of FIG. 2 can also be implemented similar to SPSA-1. However, in other embodiments, an SPS can have more or fewer blocks. SPSA-1 is shown containing gate driver 310, high-side (HS) switch 320, low-side (LS) switch 330, temperature sensor 340 and current sense block 350. Also shown in FIG. 3A are inductor 225A-1 and capacitor 226A-1. Node 240 provides the supply voltage Va. HS switch 320 and LS switch 330 may be implemented as transistors (typically power transistors). In the example of FIG. 3A, both HS switch 320 and LS switch 330 are shown as N-type metal-oxide-semiconductor field-effect transistors (N-MOS). However, other types and combinations of components can also be used to implement switches 320 and 330.

Temperature sensor 340 measures the ambient temperature at SPS 220-1 periodically, and provides the temperature values on path 214.

Gate driver 310 receives binary signal PWMA-1, and in response to the logic level of PWMA-1 generates the appropriate voltage to turn ON and turn OFF the corresponding ones of HS switch 320 and LS switch 330 in respective intervals "HS-interval" and "LS interval" of each cycle of operation indicated by PWMA-1. HS switch 320 and LS switch 330 are each shown implemented as a MOSFET (Metal Oxide Semiconductor Field Effect Transistor) with gate driver 310 driving the gate terminals of the MOSFETs, although other implementations for the switches are possible. In the example of FIG. 3A, when PWMA-1 is a logic high (corresponding to the first phase in which the high-side switch 320 is ON), gate driver 310 generates respective appropriate voltages on paths 312 (en-HS) and 313 (en-LS) to switch ON MOSFET 320 and switch OFF MOSFET 330. When PWMA-1 is a logic low (corresponding to the second phase in which the low-side switch is ON), gate driver 310 generates respective appropriate voltages on paths 312 and 313 to switch OFF MOSFET 320 and switch ON MOSFET 330.

Figure 3B:
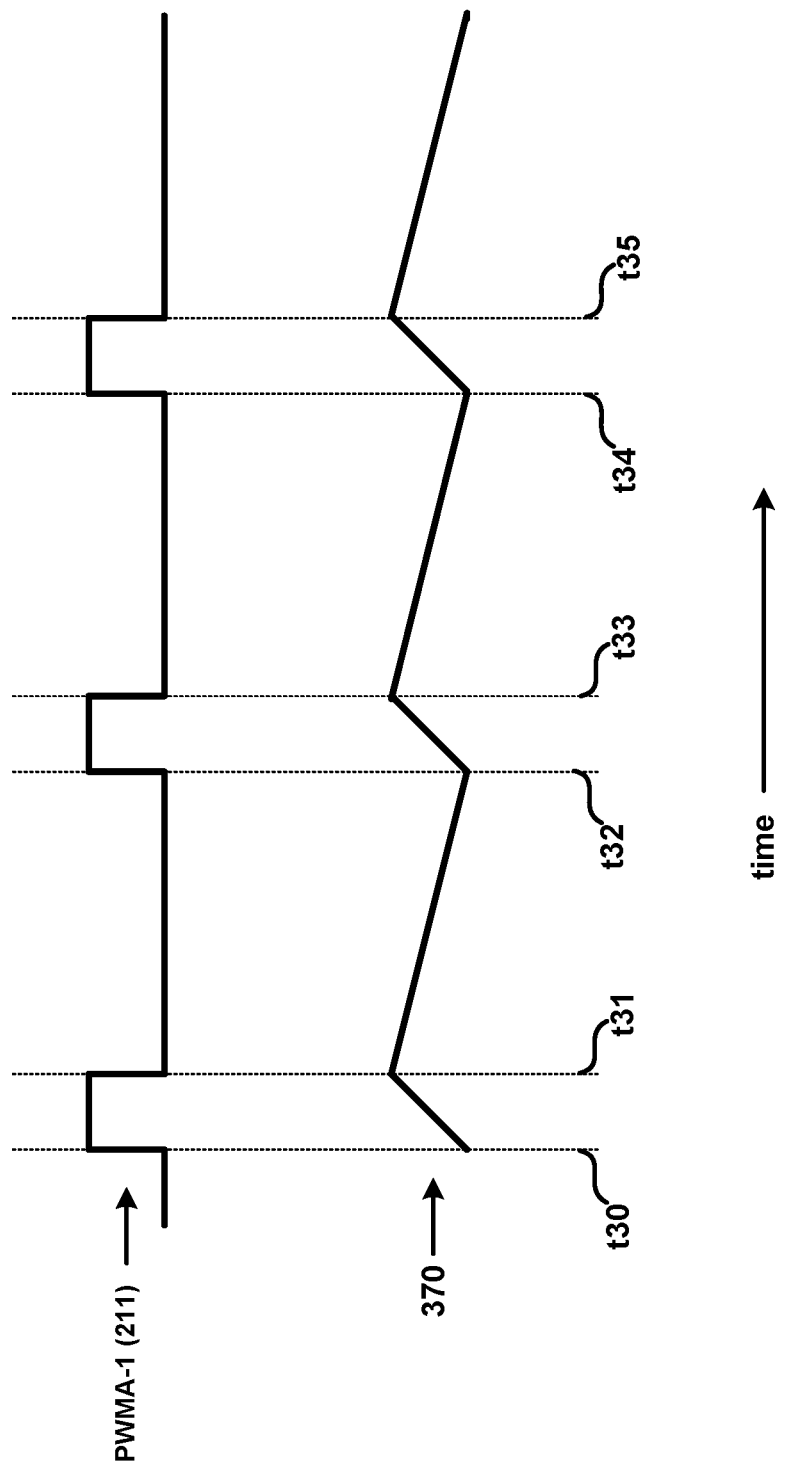
FIG. 3B is a diagram illustrating example waveforms a PWM signal and inductor-current in an SPS.

Waveforms depicting PWMA-1 (211) and inductor-current (i.e., current flowing through inductor 225A-1, labelled 370) are illustrated in FIG. 3B. When PWMA-1 is logic high (time intervals t30-t31, t32-t33 and t34-t35), HS switch 320 is ON (LS switch 330 is OFF) and current flows from Vin to the load (connected to Va node, but not shown) via HS MOSFET 320 and inductor 225A-1 with rising slope. When PWMA-1 is logic low (time intervals t31-t32 and t33-t34), LS switch 330 is ON (HS switch 320 is OFF), and the inductor-current flows in the loop formed by LS MOSFET 330, inductor 225A-1 and load with falling slope. One period of PWMA-1 signal may be referred to as a 'cycle' of operation of an SPS or switching converter in general.

Current sense block 350 operates to construct (replicate) the inductor-current, with or without scaling, and provides the constructed inductor-current on path CSA-1. Current sense block 350 may perform the replication using current measurement/sensing and/or emulation techniques. In FIG. 3A, current sense block 350 is shown as receiving the voltage across LS switch 330 as input. Current sense block 350 generates replica current CSA-1 (213) based on sensing of current through LS switch 330 (in turn based on voltage across LS switch 330), and emulation (estimation) of current through HS switch 320.

It is generally desirable to detect over-current conditions based on sensing of the voltage-drop across HS switch 320 when HS switch 320 is ON. Sensing of voltage-drop across LS switch 330 when LS switch 330 is ON would only measure the inductor-current when it is decreasing and hence cannot be relied upon for determining an (actual) over-current condition. On the other hand, when HS switch 320 is ON, the inductor-current increases, and is therefore reliable for determination of an over-current condition. Hence, over-current condition is detected when HS-switch 320 is ON.

However, when the ON duration (Ton) of HS switch 320 is very short, as for example in the examples of FIGS. 3A and 3B, the inherent delays and/or settling times of a circuitry (not shown) used to detect the over-current condition by sensing the voltage-drop across HS switch 320 may exceed the ON duration of HS switch. The very short duration of 'Ton' of HS switch 320 is also one reason that prior SPS 300 (specifically, current sense block 350) is noted above as emulating (rather than sensing/measuring) the current through HS switch 320. Furthermore, a blanking interval (not shown in FIG. 3B) may be applied to HS switch 320 in every cycle of PWMA-1 (211) to prevent transients in the voltage at node SAA-1 (221), and hence potentially at Va (240). Therefore, prior SPS 300 (and in general, a standalone or multi-phase switching converter) may not be able to reliably detect (or detect at all) an over-current condition based on sensing the current through HS switch 320 in ON durations of HS switch 320.

An SPS (or a switching converter) implemented according to several aspects of the present disclosure is capable of reliably detecting over-current conditions based on sensing of current through its HS switch even when ON durations of its HS switch are very short, as described below.

5. Reliable Over-Current Detection

Figure 4A:
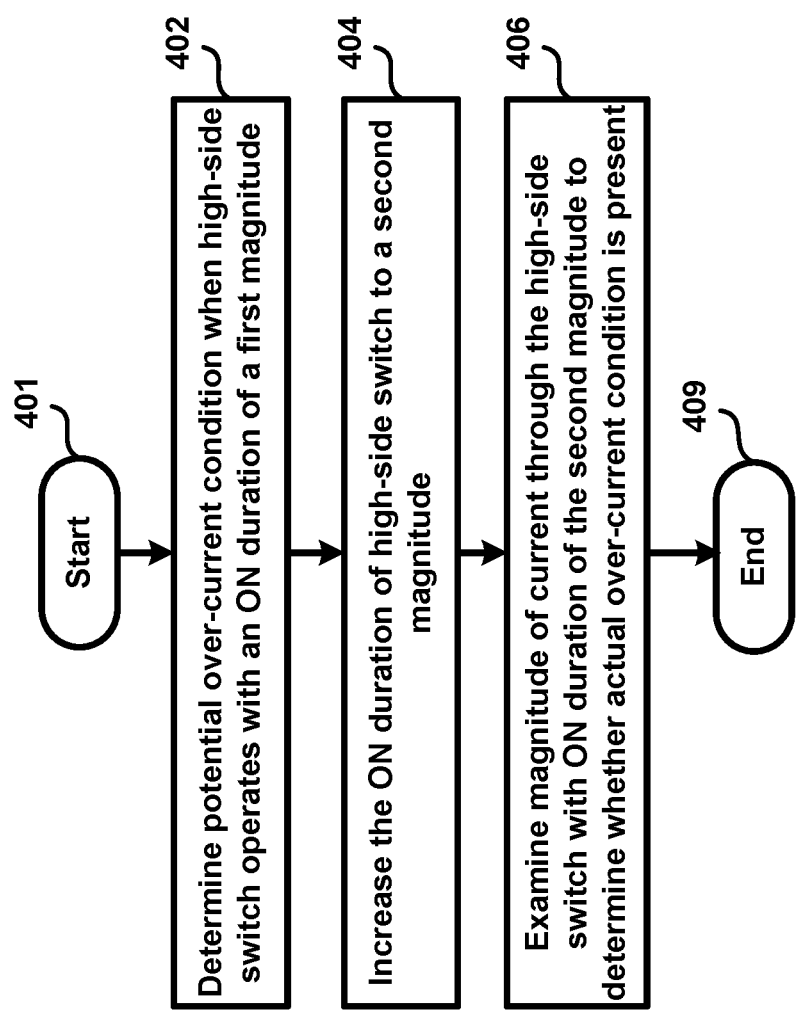
FIG. 4A is a flow chart illustrating the manner in which an over-current condition is detected according to an aspect of the present disclosure in an embodiment.

FIG. 4A is a flow chart illustrating the manner in which an over-current condition is detected based on sensing of current through the HS switch of the switching converter even when/if ON durations of the HS switch are normally very short, in an embodiment of the present disclosure. While the description is provided with specific examples, the features of the present disclosure can be employed in the corresponding circuitry/sub-systems in other component and environment without departing from the scope and spirit of various aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 401, in which control immediately passes to step 410.

In step 402, a switching converter checks if a potential over-current condition exists when high-side (HS) switch operates with an ON duration of a first magnitude. A 'potential over-current condition' refers to a condition which is suggestive of an over-current condition, but not necessarily conclusive. The first (normal) magnitude of the ON duration may be set and adjusted from time to time, for example, by a controller (210 in FIG. 2) based on the present magnitudes of the input and output voltages of the switching converter and/or the present load current. Control then passes to step 404.

In step 404, the switching converter increases the ON duration of the HS switch to a second magnitude as a response to the determination (in step 402) that a potential over-current condition exists. The duration by which the ON duration is increased may be predetermined and preset in the switching converter based on the specifics of the circuits of the switching converter, operational requirements, etc. Alternatively, the increase may be adaptively determined by switching converter using corresponding approaches. It is noted here that the increase of the ON duration in this step is independent of (and/or additional to) any increase in the course of normal operation (for example due, to factors noted above such as input and output voltages and load-current and transients). Control then passes to step 406.

In step 406, the switching converter examines the magnitude of current through the HS switch with ON duration of the second magnitude to determine whether actual over-current condition is present. The 'actual over-current condition' refers to a condition in which over-current is conclusively determined to be present. Control then passes to step 409, in which the flowchart ends.

By increasing the ON duration of the HS switch, the switching converter can reliably detect an over-current condition based on the magnitude of current through the HS switch even when the inherent delays and/or settling times of the detection circuitry are longer than the 'normal' ON duration of the HS switch.

Although the flowchart is noted as ending in step 409, the operations of the steps may be repeated. In an embodiment of the present disclosure, the operations are repeated in every cycle of PWMA-1 (211).

Further, although not noted in the flowchart, if the switching converter determines in step 406 that an actual over-current condition is not present, the switching converter reverts to using the first magnitude for the ON duration of the HS switch.

However, if the switching converter determines in step 406 that an actual over-current condition is present, the switching converter may take remedial measures to prevent or mitigate damage to the switching converter and/or the load connected to it. For example, the switching converter may switch-off the HS switch, and optionally the LS switch also, from the next cycle onwards. Additionally, the switching converter may signal a visual or audible alarm. Alternatively, the switching converter may force a load-current limit for subsequent cycle(s) of operation (i.e., cycles of PWMA-1).

It is noted here that in an embodiment, the ON-duration of the HS-switch is set to have a 'minimum' value even if the HIGH-duration of the PWM waveform happens to be less than such 'minimum' value. Such a minimum value may be forced to avoid glitches in the gate drive of the HS switch and/or to ensure a minimum ON-width needed to guarantee switching-ON of the HS switch. Hence, in the embodiment, it is this minimum ON duration that is increased in step 404 in response to step 402 evaluating TRUE. Since the switching converter increases the minimum ON duration of the HS switch only upon occurrence of a potential over-current condition, and reverts to using the normal minimum ON duration if an actual over-current condition is determined to be absent, the normal operation of the switching converter is not affected.

In general, however, the current normal ON-duration (rather than the minimum value of the ON-duration noted above) employed for the HS switch is increased in step 404 (only) in response to the condition of step 402 evaluating TRUE.

The implementation of an SPS in an embodiment of the present disclosure is described next.

6. Smart Power Stage (SPS)

Figure 4B:
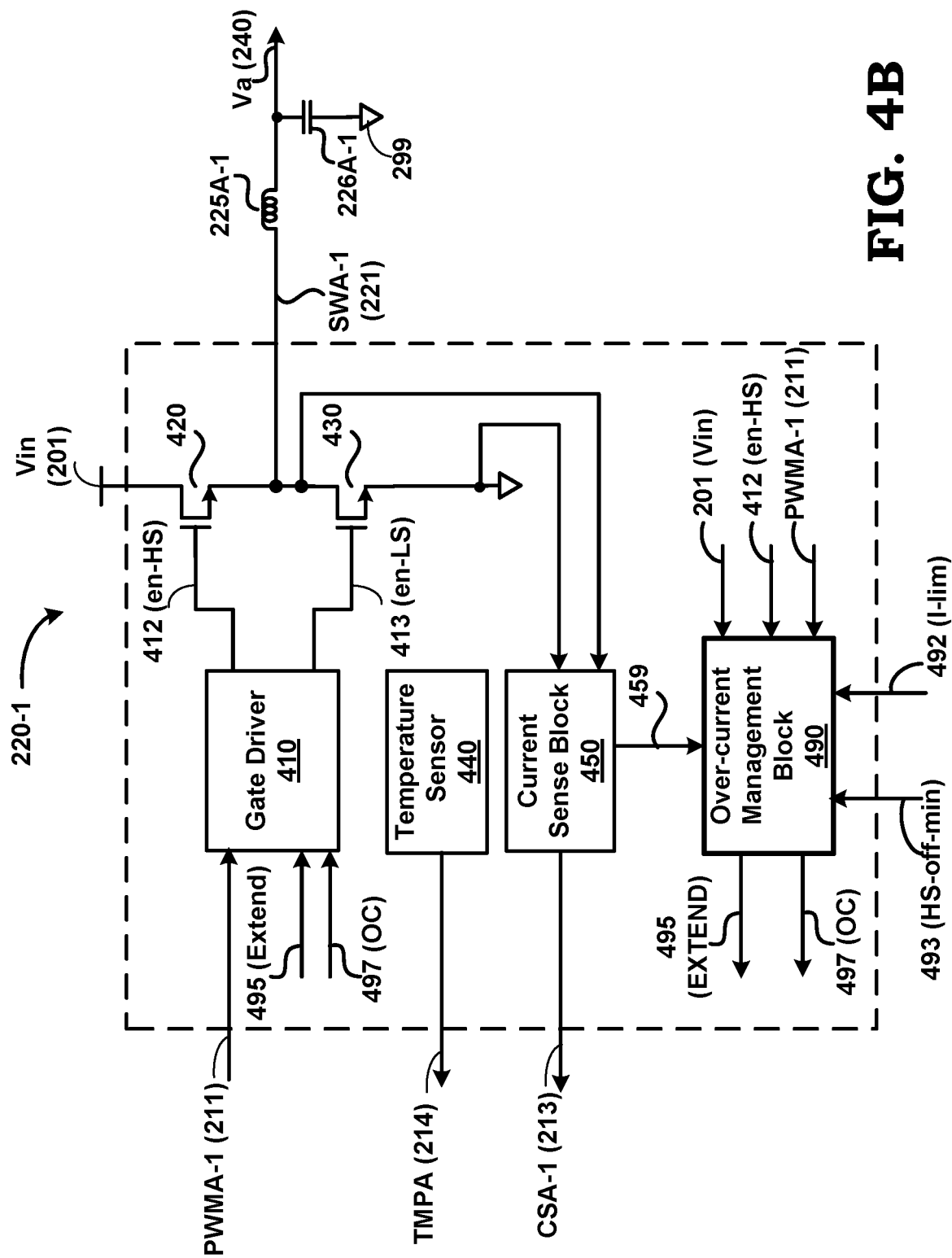
FIG. 4B is a diagram illustrating the details of an SPS in an embodiment of the present disclosure.

FIG. 4B is a diagram illustrating the details of an SPS in an embodiment of the present disclosure. SPSA-1 220-1 (also shown in FIG. 2) is shown containing gate driver 410, high-side (HS) switch 420, low-side (LS) switch 430, temperature sensor 440, current sense block 450 and over-current management block 490. Also shown in FIG. 4B are inductor 225A-1 and capacitor 226A-1. Node 240 provides the supply voltage Va. HS switch 320 and LS switch 330 may be implemented as transistors (typically power transistors). In the example of FIG. 4B, both HS switch 320 and LS switch 330 are shown as N-type metal-oxide-semiconductor field-effect transistors (N-MOS). However, other types and combinations of components can also be used to implement switches 420 and 430.

Gate driver 410, high-side (HS) switch 420, low-side (LS) switch 430, temperature sensor 440 and current sense block 450 operate respectively similar to gate driver 310, high-side (HS) switch 320, low-side (LS) switch 330, temperature sensor 340 and current sense block 350 of SPS 300 of FIG. 3A, and such similar/common operations are not described again in the interest of conciseness. Only the additions to, and/or differences in, their operations are noted herein.

Gate driver 410 generates control signals 412 (en-HS) and 413 (en-LS) for switching-ON and switching OFF respective switches 420 and 440 in each operating cycle of SPS 220-1 based on PWMA-1 (211). Gate driver 410 is shown as additionally receiving signals 495 (EXTEND) and 497 (OC), each of which may be binary signals, and which are generated by over-current management block 490 as described below.

When signal EXTEND is asserted (logic HIGH in the examples herein), gate driver 410 increases the normal ON duration of HS switch 420, and generates en-HS with the increased ON duration in the immediately subsequent cycle. Thus, gate driver 410 may add a pre-determined or dynamically-determined duration to the present (normal) ON duration. In the absence of assertion of signal EXTEND, gate driver 410 employs the present normal ON duration.

When signal OCP (Over-Current Protection) is asserted (logic Low in the examples herein), gate driver 410 may switch-off the HS switch, and optionally the LS switch also, from the next cycle onwards. Alternatively, gate driver 410 may force a load-current limit for every cycle of operation (i.e., every cycle of PWMA-1). In the absence of assertion of signal OCP, gate driver 410 employs the present respective normal ON durations for HS switch 420 and LS switch 430.

Current sense block 450 forwards on path 459, information representing an estimate of the magnitude of inductor-current of SPS 220-1. The information can be, for example, in the form of a current, a voltage or digital values. In an embodiment of the present disclosure, the information is in the form a current, as described in sections below. As also noted above, the magnitude of inductor-current is indicative of abnormal or excessive load-current. Additionally, the inductor-current is also indicative of at least some types of circuit-faults in SPS 220-1 or the printed circuit board (PCB) or system containing SPS 220-1. One example of such a circuit-fault is a short between node 240 and ground 299 due to one or more faulty output-capacitors (e.g., 226A-1) at node 240 or PCB-faults.

Over-current management block 490 receives as inputs Vin (201), 412 (en-HS), signal 459, I-lim (492), LS-off (493) and PWMA-1 (211), and based on the corresponding ones of these inputs (as described below) generates signals 495 (Extend) and 497 (OC) for use by gate driver 410 as noted above. Over-current management block 490 asserts signal EXTEND if block 490 determines that a potential over-current condition is present, and maintains signal EXTEND de-asserted otherwise. Over-current management block 490 asserts signal OC if block 490 determines that an actual over-current condition is present, and maintains signal OC de-asserted otherwise.

SPS 220-1 can therefore reliably detect actual over-condition conditions and take remedial measures even when ON durations of the HS switch are short.

The implementation details of over-current management block 490 in an embodiment of the present disclosure are provided next.

7. Over-Current Management Block

Figure 5:
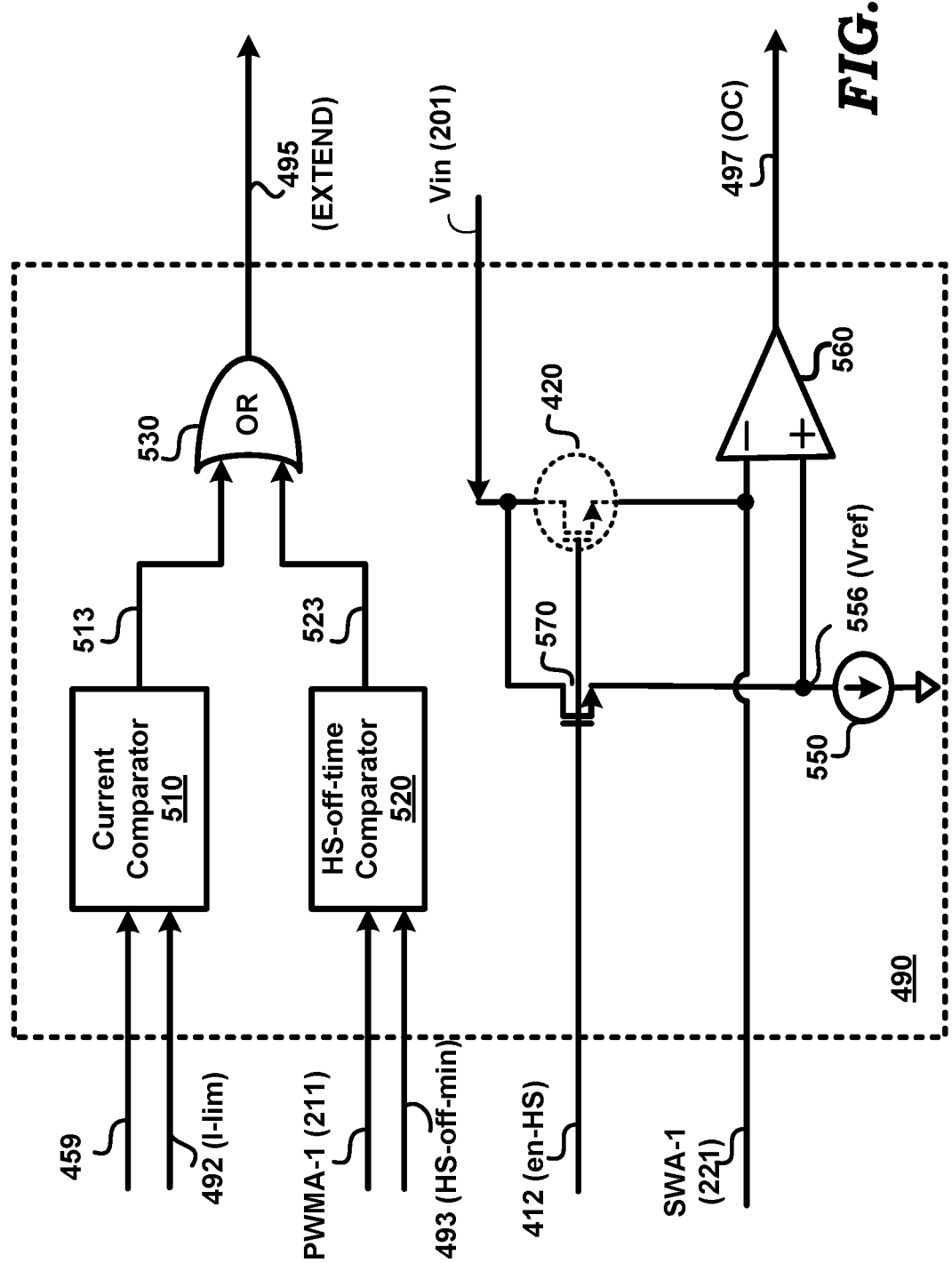
FIG. 5 is a block diagram illustrating the implementation details of an over-current management block of an SPS in an embodiment of the present disclosure.

FIG. 5 is a block diagram illustrating the implementation details of an over-current management block in an embodiment. Over-current management block 490 is shown containing current comparator 510, HS-off-time comparator 520, OR gate 530, transistor 570, current sink 550 and voltage comparator 560. Transistor 420 is the HS switch shown in FIG. 4B, and is shown in dotted lines in FIG. 5 to indicate that transistor 420 is external to over-current management block (as also shown in FIG. 4B), but which, in conjunction with transistor 570 forms a current-mirror circuit.

Current comparator 510 receives on path 459, information representing the magnitude of LS switch current estimated by current sense block 450 based on measuring/sensing the voltage across LS switch 430 in the latest/present LS-phase of a cycle. Although not conclusive or reliable indication of an actual over-current/over-load condition, the sensing of the current through LS switch can nonetheless be an indicator of probable/potential over-current condition. Also, the LS phases (second phases) are usually long enough to permit reliable measurement of current through the LS switch. The information on path 459 can be in any form, such as for example, a current, a voltage or a digital value. In an embodiment of the present disclosure, the information is in the form of a current as described in sections below. Current comparator 510 receives, on path 492, information (e.g., in the form of a current as noted below) specifying a threshold value (I-lim) of LS switch current that corresponds to a maximum safe value of inductor-current or load current of SPS 220-1. For example, if the maximum safe load current is 60 A (meaning a load current greater than 60 A represents an actual over-current condition), then I-lim may be 40 A. If the current magnitude on path 459 exceeds I-lim, current comparator 510 asserts signal 513. Otherwise, current comparator 510 maintains (or resets) signal 513 to the de-asserted state. Based on the inputs received on path 459 and 492, current comparator generates a signal (e.g., a binary signal) on path 513 indicating whether or not the LS switch current 459 exceeds I-lim. An indicator of a potential over-current condition is when LS switch current exceeds I-lim. I-lim may be hardwired in power supply 110 or be received as an input from an external device (not shown) or as a user input.

HS-off-time comparator 520 receives PWMA-1 on path 211 and a signal HS-off-min on path 493. HS-off-min specifies a lower limit for the OFF-time of HS switch 420 in any cycle of PWMA-1. HS-off-time comparator 520 determines the latest/present off-time of HS switch 420 from PWMA-1. If the latest/present off-time of the HS switch is less than HS-off-min, comparator 520 asserts signal 523. Otherwise, comparator 520 maintains signal 523 in the de-asserted state or resets signal to the de-asserted state. The lower limit for the OFF-time of HS switch 420 is another indicator of a potential over-current condition, since phase controller 210 would decrease the OFF-time of HS switch (while increasing the ON-time of HS switch 420) as the load current increases. HS-off-min may be hardwired in power supply 110 or be received as an input from an external device or as a user input. It may be appreciated that even when HS switch ON-time is too short to be reliably measured, the OFF-time of the HS switch may be sufficiently long, and can be reliably measured.

OR gate 530 generates binary signal EXTEND on output path 495 as the result of a logical-OR operation on signals 513 and 523, each of which is a binary signal in an embodiment of the present disclosure. As noted above, when asserted, signal EXTEND indicates that the ON-duration of HS switch 420 is to be extended. The magnitude of the extension may be pre-determined depending on parameters of the specific design of SPS 220-1, operating environment, etc. Examples of such parameters include the desired magnitude of regulated output voltage, PWM frequency, inherent operating speeds and delays in corresponding circuit portions such as the OCP circuit described below.

Transistor 570 (in combination with transistor 420), current sink 550 and voltage comparator 560 together operate as an over-current protection (OCP) circuit. Transistors 450 and HS switch 420 form a current-mirror pair, and their sizes may be in the ratio 1:N, N being greater than 1. Thus, the gate terminal of transistor 570 also receives en-HS (412). Current through transistor 570 is a scaled-down version of the current flowing through HS switch 420. Current sink 550 sinks a constant current via transistor 570, and is connected between the source terminal of transistor 570 and ground. The drain terminal of transistor 570 is connected to Vin (201).

During ON-times of HS switch 420, HS switch 420 develops a drain-to-source voltage of Ron*Iload ('*' represents multiplication). As an example, Ron may equal 5 milli-ohm and the maximum safe load-current (Iload-max) may be 70 A. Under such condition, the drain-to-source voltage of HS switch 420 equals 350 mV. In general, the drain-to-source voltage of HS switch 420 corresponding to a maximum load current would be known or set a priori, and a reference voltage limit corresponding (e.g., proportional) to such voltage is set using transistor 570 and current sink

550. The constant current sunk by current sink 550 is set such that voltage comparator 560 switches its output OC (497) when the load current exceeds Iload-max. Thus, the fixed voltage Vref at node 556 represents a maximum load-current limit corresponding to Iload-max.

The positive (+) and negative (−) input terminals of voltage comparator 560 are respectively connected to node 556 (Vref) and SWA-1 (221). When the load current is less than or equal to Iload-max, the voltage at node 221 is greater than that at node 556, and output signal OC is a logic LOW (deemed to be the de-asserted state). When the load current exceeds Iload-max, the voltage at node 221 falls below that at node 556, and output signal OC is a logic HIGH (deemed to be the asserted state) and gate driver 410 responds to the logic-low as noted above. The OCP circuit completes examination of the magnitude of the load current and the determination of an actual over-current condition in a single cycle of PWMA-1 (211).

During OFF times of HS switch 420 and ON times of LS switch 430, a default weak pull-up (not shown) at the output 497 of voltage comparator 560 maintains OC at a de-asserted state.

It may be appreciated that 'Ton' pulse (ON duration of HS switch 420) should be longer than the settling time of the OCP circuit. The settling time may be due to finite delays in response of voltage comparator 560, path delays in the connection paths within the OCP circuit, etc. As an example, a Ton larger than 60 nanoseconds (ns) may be required for reliable detection of over current condition by the OCP circuit. However, as an example, at least in steady-state operation of SPS 220-1, Ton can be as small as 45 ns— corresponding to Vin being 22 volts (V) and Va being 1 V, with Fs being 1 MHz (Fs is the frequency of the PWM 211 clock signal.

Increasing Ton upon determining a potential over-current condition as described above enables reliable detection of an actual over-current condition, and subsequent remedial measures.

The extension of the ON duration of HS switch 420, and reverting to the normal ON duration if actual over-current condition is deemed not to exist are illustrated next with timing diagrams.

Figure 6A:
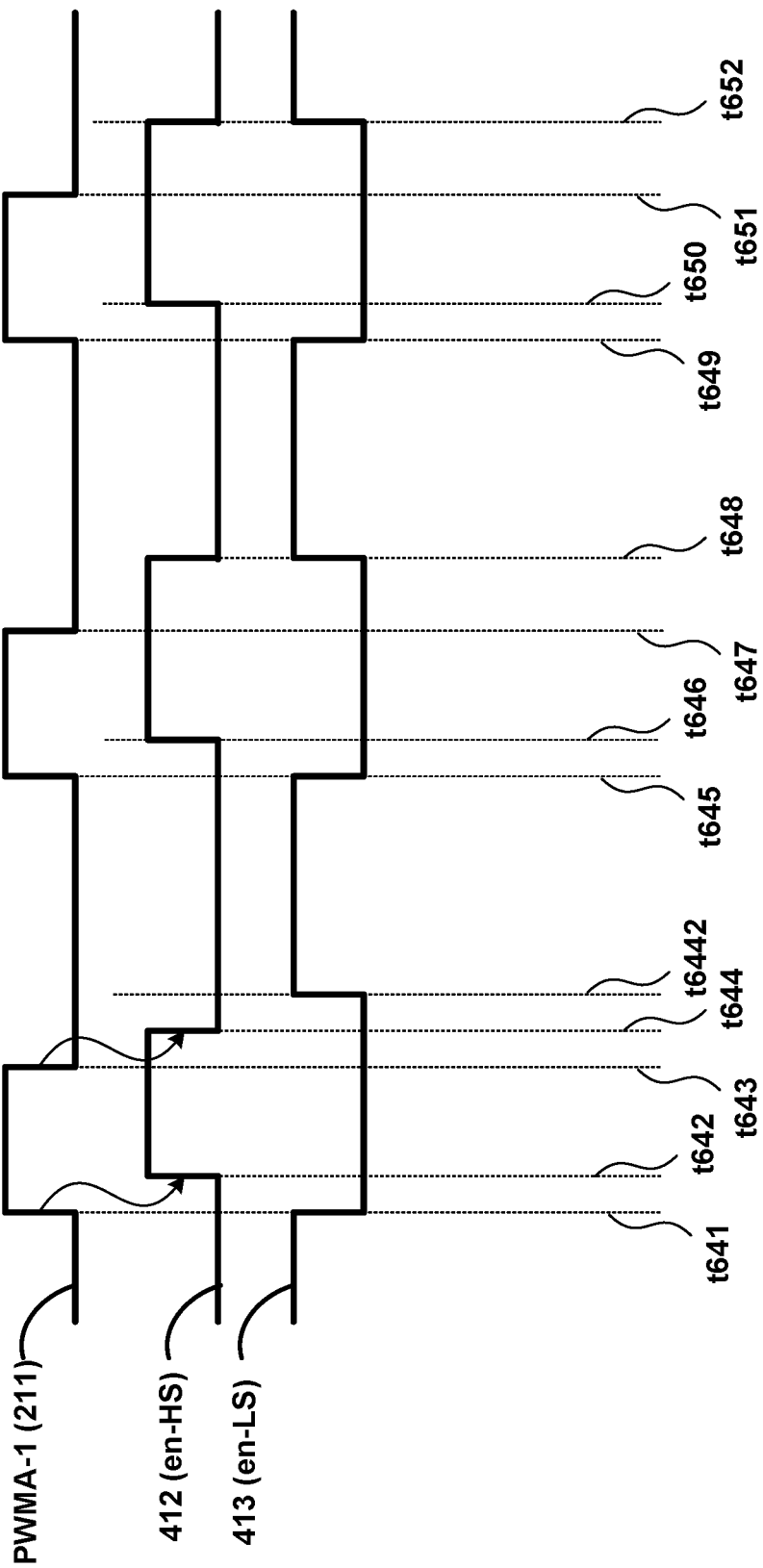
FIG. 6A is a timing diagram illustrating an example of extension of ON-duration (Ton) of a high-side switch of an SPS, in an embodiment of the present disclosure.

FIG. 6A is a timing diagram (not to scale) illustrating an example of extension of ON-duration (Ton) of HS switch 420. Example waveforms for PWMA-1, en-HS and en-LS are shown. As noted above, signals en-HS and en-LS are generated by gate driver 410 (FIG. 4B). Logic HIGH portions of PWMA-1 of a PWM cycle (e.g., t641-t643) cause gate drive 410 to generate en-HS with a logic HIGH to switch-ON HS side switch 420. The rising and falling edges of en-HS resulting from the rising and falling edges of PWMA-1 are indicated by arrows, and are shown as occurring with a small respective delay at time instants t642 and t644.

Gate driver 410 generates en-LS as the inverse of en-HS but with 'guard' intervals (e.g., t641-t642 and t644-t6442) on either side of en-HS to ensure that the HS and LS switches are never both ON in any interval to prevent short from Vin to ground (shoot-through condition). Time t641 shows the falling edge of en-LS of a previous cycle. T6442 to t645 represents a next en-LS ON duration.

Assuming that a potential over-current condition exists/or is detected by over-current management block, the next pulse of en-HS will be extended by gate driver 410 in response to signal OC. Accordingly, in the next PWM cycle, PWMA-1 is a logic HIGH from t645-t647. Gate driver 410 drives en-HS high at t646 and maintains the logic HIGH duration until t648. Interval t646-t648 is longer than t642-t644 of the previous cycle, as well as interval t645-t647. The extent of extension of en-HS may be either pre-programmed in Gate driver 410 based on the knowledge of the shortest possible Ton as well as the speed parameters of the OCP circuit. In FIG. 6A, the waveforms for the next cycle of PWM are shown to have same widths as in the previous cycle. Thus, t651-t652 is shown as being the same as t647-t648. However, typically, one cycle is sufficient for determination of an actual over-current condition (which may be determined to be present in interval t647-t648 itself). In response to an EXTEND asserted signal (which may be generated sometime shortly after t668, gate driver 410 may switch OFF HS switch 420. In addition, gate driver may also switch OFF LS switch 430. Alternatively, phase controller 210 in combination with the SPSes of phase A, may force cycle-by-cycle current limiting of the load current drawn from Va.

Figure 6B:
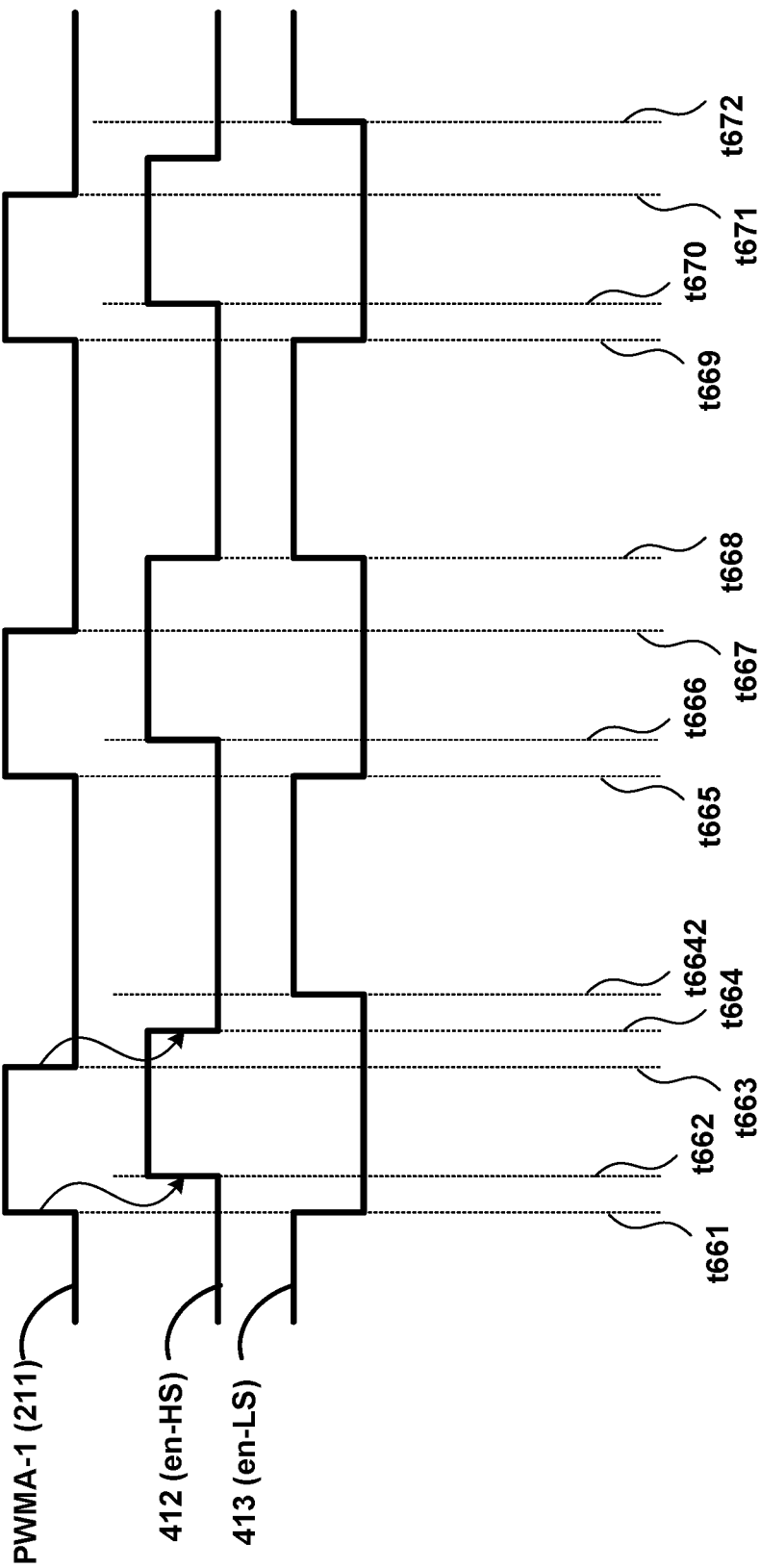
FIG. 6B is a timing diagram illustrating reverting to a normal ON duration for the HS switch if an actual over-current condition is determined not to exist, in an embodiment of the present disclosure.

In FIG. 6B, the waveforms of the various signals in the first cycle of PWM signal are identical to those in the first cycle shown in FIG. 6A. Time instants t661, t662, t663, t664 and t6642 correspond respectively to t641, t642, t643, t644 and t6442.

The waveforms of the second PWM cycle of FIG. 6B is identical to those of the second PWM cycle of FIG. 6A, with gate driver 410 extending the ON-duration of HS switch. Time instants t665, t665, t667 and t668 correspond respectively to t645, t646, t643, t647 and t648 of FIG. 6A.

Assuming that an actual over-current condition does not exist (despite potential over-current conditions being present), the OCP circuit de-asserts signals OC and EXTEND causing gate driver 410 to revert the ON duration of HS switch 420 back to the normal duration (here duration of HS switch in the first cycle of FIG. 6A). Due to such an approach, the impact to other power supply parameters, such as voltage Va, are minimal.

The implementation details of a portion of gate driver 410, current comparator 510 and HS-off-time comparator 520 in example embodiments are briefly described next.

8. Example Embodiments

Figure 7:
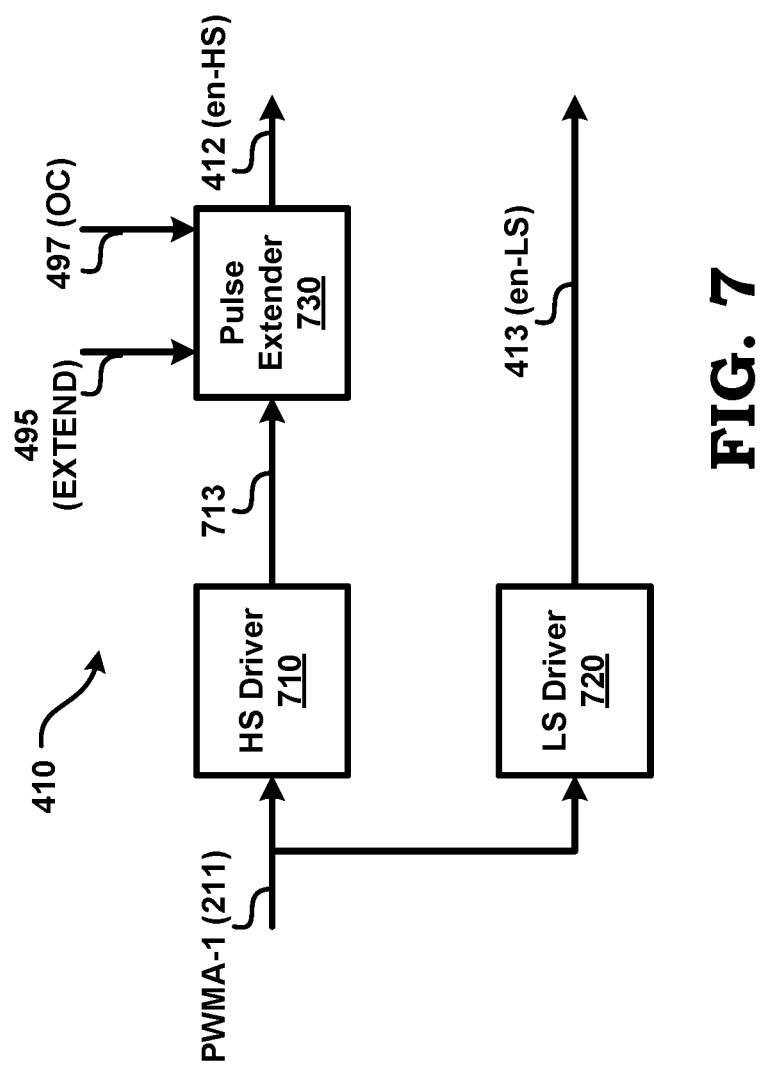
FIG. 7 is a block diagram illustrating the implementation details of a gate driver of an SPS in an embodiment of the present disclosure.

FIG. 7 is a block diagram illustrating the implementation details of a gate driver of an SPS in an embodiment of the present disclosure. Gate driver 410 is shown containing high-side (HS) switch driver 710, low-side (LS) switch driver 720 and pulse extender 730.

HS driver 710 receives PWMA-1 on path 211, and generates a drive signal on path 713 with a logic HIGH in response to PWMA-1 being a logic HIGH, and a logic LOW in response to PWMA-1 being a logic LOW. LS driver 720 receives PWMA-1 on path 211, and generates a drive signal en-LS on path 413 with a logic LOW in response to PWMA-1 being a logic HIGH, and a logic HIGH in response to PWMA-1 being a logic LOW. Additionally, although not shown, gate driver 410 may contain feedback paths from node 713 to LS driver 720, as well as from node 413 to HS driver 710. Such feedback is provided to enable drivers 710 and 720 to generate corresponding drive signals that do not ever overlap.

Pulse extender 730 is shown as receiving signals EXTEND and OC as well as signal 713. Depending on the logic conditions of EXTEND and OC, pulse extender 730 modifies signal 713 to generate en-HS on path 412. When EXTEND and OC are each in a de-asserted state, pulse extender 730 forwards signal 713, without modification, on path 412. When EXTEND is asserted (with OC remaining de-asserted), pulse extender 730 increases the logic-HIGH (ON) duration of signal 730 by a pre-determined duration. In an embodiment, pulse extender 730 is implemented using a digital counter and corresponding logic to cause such extension, and the implementation would be apparent to one skilled in the relevant arts upon reading the disclosure herein. When OC is asserted, pulse extender 730 generates en-HS and en-LS as a logic LOW, thereby switching OFF both the HS switch 420 and LS switch 430. Various modifications of the implementation and operation of gate driver 410 described above are possible.

Figure 8:
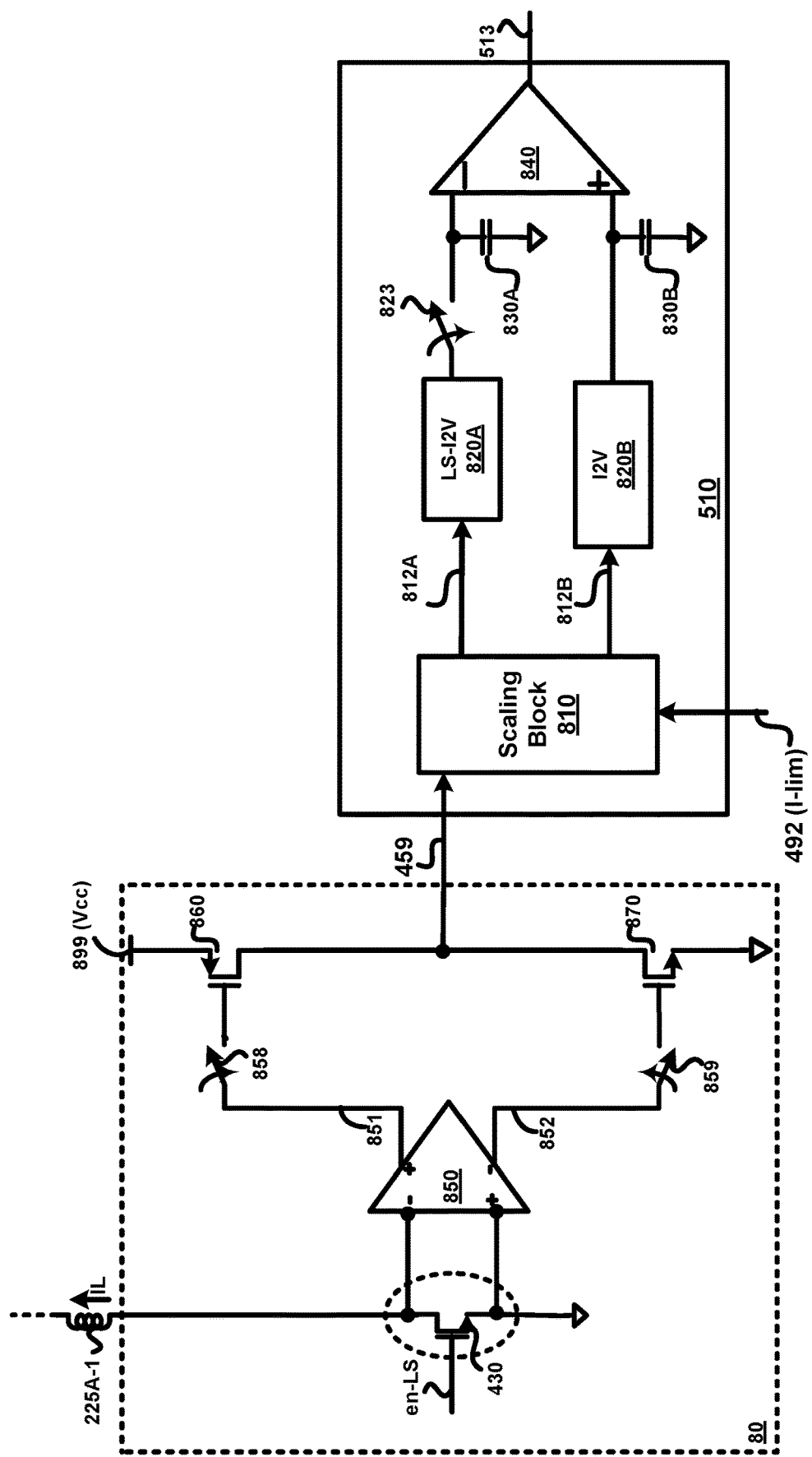
FIG. 8 is diagram illustrating the implementation details of a current comparator used in an over-current management block, in an embodiment of the present disclosure.

FIG. 8 is diagram illustrating the implementation of current comparator 510 in an embodiment of the present disclosure. Also shown in FIG. 8 is a portion 80 of current sense block 450 (FIG. 4B) as relevant to the present disclosure.

Circuit 80 is shown containing amplifier 850, transistors 860 and 870 and switches 858 and 859, and operates to measure the inductor current IL (inductor 225A-1 of FIG. 2 is also shown for clarity) whenever LS switch 430 is closed (LS phase) and driving the inductor current. Circuit 80 provides the measured inductor-current as an output on path 459 for use by current comparator 510. The operation of circuit 80 is first briefly described.

Transistors 860 and 870 are respectively P-channel metal oxide semiconductor field effect transistors (PMOS) and N-channel metal oxide semiconductor field effect transistors (NMOS). Supply Vcc (899) may be provided to SPSA-1 by phase controller 210 (FIG. 2), or be generated in VRM 199 in a known way. For clarity, LS switch 430 is also shown, although it would typically not be part of circuit 80.

Amplifier 850 receives the voltage across LS switch 430 in the second phases, and provides an amplified voltage as an output across paths 851 and 852. Although not shown, amplifier 850 includes a feedback network to operate amplifier 850 in closed-loop mode.

Switches 858 and 859 are closed in each LS phase, and open otherwise. Therefore, in each LS phase, voltages 851 and 852 respectively cause transistors 860 and 870 to source and sink respective currents based on the specific magnitudes of voltages 851 and 852 and therefore the voltage across LS switch 430. The difference current between the current sourced by transistor 860 and the current sunk by transistor 870 is available on 459, and is a replica (scaled or actual) of the inductor-current in the LS phase.

Current comparator 510 is shown containing scaling block 810, current-to-voltage converters LS-I2V (820A) and HS-I2V (820B), capacitors 830A and 830B, and comparator 840. Scaling block 810 (which may, for example employ current-mirror circuits to scale the currents on path 459 and path 492) receives the currents on paths 459 and 492 (I-lim) as inputs, scales the respective currents, and provides the scaled versions on paths 812A and 812B respectively. Scaling block 810 may be implemented in a known way.

Each of the two I2V blocks 820a and 820b converts the current on respective input paths 812a and 812b into respective voltages at its output terminals. Switch 823 is closed in each LS-blank phase, and is open otherwise. An LS-blank phase is usually introduce between the end of a HS phase (HS switch ON) and the immediately following LS phase to allow transients in the circuits in LS driver 720 to disappear. When an LS blank phase is not employed, switch 823 may instead be closed for a brief interval at the end of the HS phase, and is open otherwise. The voltage on capacitor 830A at the end of each LS-blanking phase is representative of the maximum inductor-current. Voltage comparator 840 generates binary signal 513 as a logic LOW if voltage on capacitor 830A exceeds that on 830B, and vice-versa.

Figure 9:
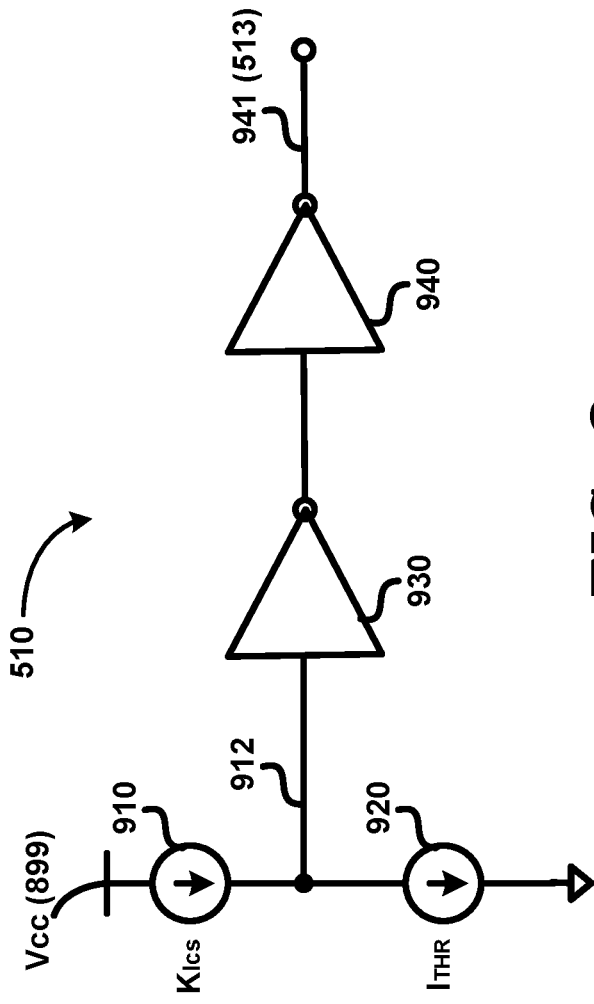
FIG. 9 is a diagram illustrating the implementation details of a current comparator used in an over-current management block in an alternative embodiment of the present disclosure.

FIG. 9 is a diagram illustrating the implementation of current comparator 510 in an alternative embodiment. Current comparator 510 is shown containing current source 910, current sink 920, and inverters 930 and 940. Current source 910 generates a scaled version of the inductor-current in the LS phase. The magnitude of the scaled current is indicated as K*Ics, and the scaling is done on signal 459. The scaling circuit and connection of signal 459 to current source 910 are not shown in the interest of conciseness. Current sink 920 generates a scaled version of I-lim (492) (see FIG. 4B). The magnitude of the scaled current is indicated by Ithr. Again, the scaling circuit and connection of I-lim 492 are not shown in the interest of conciseness). When Ics (459) is less than I-lim 492, K*Ics is also less than Ithr, and the voltage on path 912 representing the difference between the currents of 910 and 920 is a logic LOW. The logic LOW is propagated to output node 941 via the inverters 930 and 940. Node 941 is the equivalent of node 513, and is provided as input to OR gate 530 (FIG. 5).

Figure 10:
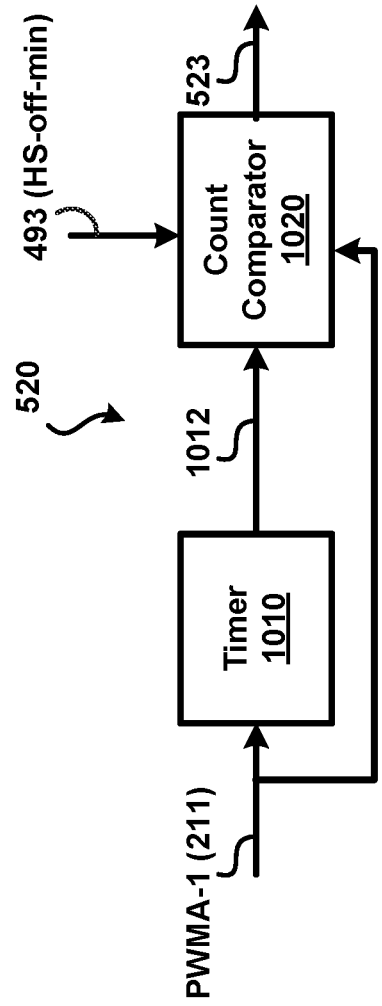
FIG. 10 is a block diagram illustrating the implementation details of an HS-off-time comparator used in an over-current management block in an embodiment of the present disclosure.

FIG. 10 is a block diagram illustrating the implementation details of HS-off-time comparator 520 in an embodiment of the present disclosure. HS-off-time comparator 520 is shown containing timer 1010 and count comparator 1020. Timer 1010 starts incrementing a count value (started at value 0) at the falling edge of PWMA-1 (211), and stops counting at the next rising edge of PWMA-1. Timer 1010 may employ a clock internally to increment an internal counter, and may be implemented in a known way. Timer 1010 provides the count obtained at the end of the HS OFF duration on path 1012. Count comparator 1020 compares the count on path 1012 with a count HS-off-min available on path 493. Count comparator 1020 asserts signal 523 to a logic HIGH level if the count on path 1012 is greater than HS-off-min, and de-asserts signal 523 otherwise.

9. Conclusion

References throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

While in the illustrations of FIGS. 1, 2, 4B 5, 7, 8, 9 and 10, although terminals/nodes are shown with direct connections to (i.e., "connected to") various other terminals, it should be appreciated that additional components (as suited for the specific environment) may also be present in the path, and accordingly the connections may be viewed as being "electrically coupled" to the same connected terminals.

It should be appreciated that the specific type of transistors (such as NMOS, PMOS, etc.) noted above are merely by way of illustration. However, alternative embodiments using different configurations and transistors with similar characteristics will be apparent to one skilled in the relevant arts by reading the disclosure provided herein.

Accordingly, in the instant application, the power and ground terminals are referred to as constant reference potentials, the source (emitter) and drain (collector) terminals of transistors (though which a current path is provided when turned on and an open path is provided when turned off) are termed as current terminals, and the gate (base) terminal is termed as a control terminal.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A switching converter comprising:
a first switch;
a gate driver operable to drive said first switch with an ON duration of a first magnitude normally to provide a first output voltage, wherein said ON duration corresponds to a first phase of each cycle of a sequence of cycles of a periodic clock signal; and
an over-current management block operable to:
check whether a potential over-current condition is present when said first switch operates with an ON duration of a first magnitude;
in response to a presence of potential over-current condition, cause said gate driver to increase an ON duration of said first switch to a second magnitude; and
examine a magnitude of current through the first switch with the ON duration of the second magnitude to determine whether an actual over-current condition is present.

2. The switching converter of claim 1, wherein said over-current management block is further operable to revert said ON duration to said first magnitude upon completion of said examination if said actual over-current condition is determined not to be present.

3. The switching converter of claim 2, wherein said examination, including said determination, is performed in a single cycle of said periodic clock signal with said ON duration equal to said second magnitude.

4. The switching converter of claim 2, wherein said over-current management block is further operable to cause said gate driver to switch off said first switch if said actual over-current condition is determined to be present.

5. The switching converter of claim 2, wherein said first switch is a high-side switch, wherein said switching converter further comprises a low-side switch in series with said high-side switch at a node,
wherein a load current of said switching converter is drawn from said node,
wherein said actual over-current condition corresponds to a condition when said load current exceeds a safe limit,
wherein said gate driver drives said low-side switch to be ON in a second phase of each cycle of said sequence of cycles.

6. The switching converter of claim 5, wherein said gate driver receives said periodic clock signal and drives said high-side switch and said low-side switch to an ON condition normally according to the first phase and the second phase of said periodic clock signal respectively, but drives said high-side switch with duration of said first phase equaling said second magnitude upon determination by said over-current management block of said potential over-current condition.

7. The switching converter of claim 6, wherein said over-current management block concludes that a potential over-current condition exists if a current flowing through said low-side switch exceeds a first current threshold,
wherein said first magnitude of duration for said first phase is insufficient to reliably determine presence of said actual overcurrent condition,
wherein said second magnitude of duration for said first phase is sufficient to reliably determine presence of said actual overcurrent condition,
wherein duration of said second phase is more than said second magnitude of duration.

8. The switching converter of claim 7, wherein said over-current management block concludes that a potential over-current condition exists if said current flowing through said low-side switch exceeds said first current threshold, or if an OFF-duration of said high-side switch is less than a second threshold duration.

9. The switching converter of claim 8, wherein said over-current management block comprises:
a first current source to source into a first node, a scaled version of an inductor-current of said switching converter flowing through said low-side switch in second phases of each of said sequence of cycles;
a first current sink coupled in series with said first current source at said first node, said first current sink to sink from said first node, a scaled version of a maximum load current permitted to be drawn from said switching converter; and
a first inverter coupled to receive a difference current from said first node as an input, said first inverter to generate, as an output, a binary level indicating if said difference current is positive or negative to indicate said potential over-current condition.

10. The switching converter of claim 9, wherein said over-current management block further comprises:
a timer coupled to receive as an input, said periodic clock signal, said period clock signal representing a pulse-width modulated (PWM) signal for operation of said high-side switch and said low-side switch, said timer to generate as an output a count value representing an OFF-duration of said PWM signal; and
a count comparator to compare said count value with a threshold count value representing a lower threshold for said OFF-durations to generate an output signal indicating whether an OFF-duration of said PWM signal is lesser than said lower threshold.

11. A switching converter comprising:
a high-side switch coupled in series with a low-side switch at a node, wherein said high-side switch and said low-side switch are driven in an ON state or an OFF state according to a first internal clock and a second internal clock;
a gate driver operable to provide said first internal clock and said second internal clock based on an external clock having a sequence of cycles, with each cycle having a high level and a low level, duration of said high level being a first magnitude,
wherein said first internal clock, in a normal operation, is at said high level in durations said external clock is at said high level and at said low level in durations said external clock is at said low level such that said high-side switch is in said ON state with duration equaling said first magnitude in said normal operation,
wherein said second internal clock, in said normal operation, is at said low level in durations said external clock is at said high level and at said high level in durations said external clock is at said low level; and
an over-current management block operable to:
check whether a potential over-current condition is present during said normal operation;
in response to a presence of said potential over-current condition, cause said gate driver to increase duration of said high level of said first internal clock to a second magnitude such that said high-side switch is driven in said ON state for duration of said second magnitude; and examine a magnitude of current through the high-side switch with the ON duration of said second magnitude to determine whether an actual over-current condition is present.

12. The switching converter of claim 11, wherein said over-current management block concludes that said potential over-current condition exists if current flowing through said low-side switch exceeds a first current threshold when said low-side switch is ON, or if an ON-duration of said low-side switch is less than a second threshold duration.

13. The switching converter of claim 12, wherein said over-current management block comprises:
 a first current source to source into a first node, a scaled version of an inductor-current of said switching converter flowing through said low-side switch in ON states of said low-side switch;
 a first current sink coupled in series with said first current source at said first node, said first current sink to sink from said first node, a scaled version of a maximum load-current permitted to be drawn from said switching converter; and
 a first inverter coupled to receive a difference current from said first node as an input, said first inverter to generate, as an output, a binary level indicating if said difference current is positive or negative to indicate said potential over-current condition.

14. The switching converter of claim 13, wherein said over-current management block further comprises:
 a timer coupled to receive as an input, said external clock, said external clock signal representing a pulse-width modulated (PWM) signal for operation of said high-side switch and said low-side switch, said timer to generate as an output a count value representing an OFF-duration of said PWM signal; and
 a count comparator to compare said count value with a threshold count value representing a lower threshold for said OFF-durations to generate an output signal indicating whether an OFF-duration of said PWM signal is less than said lower threshold.

15. A voltage regulator module (VRM) comprising:
 a phase controller to generate a regulated supply voltage on a first supply node;
 a first inductor coupled to the first supply node; and
 a first smart power stage (SPS) comprising:
 a first switch;
 a gate driver operable to drive said first switch with an ON duration of a first magnitude normally to provide said regulated supply voltage, wherein said ON duration corresponds to a first phase of each cycle of a sequence of cycles of a periodic clock signal; and
 an over-current management block operable to:
 check whether a potential over-current condition is present when said first switch operates with an ON duration of a first magnitude;
 in response to a presence of potential over-current condition, cause said gate driver to increase an ON duration of said first switch to a second magnitude; and
 examine a magnitude of current through the first switch with the ON duration of the second magnitude to determine whether an actual over-current condition is present.

16. The VRM of claim 15, wherein said over-current management block is further operable to revert said ON duration to said first magnitude upon completion of said examination if said actual over-current condition is determined not to be present.

17. The VRM of claim 16, wherein said examination, including said determination, is performed in a single cycle of said periodic clock signal with said ON duration equal to said second magnitude.

18. The VRM converter of claim 16, wherein said over-current management block is further operable to cause said gate driver to switch off said first switch if said actual over-current condition is determined to be present,
 wherein said first switch is a high-side switch, wherein said first SPS further comprises a low-side switch in series with said high-side switch at a node,
 wherein a load current of said first SPS is drawn from said node,
 wherein said actual over-current condition corresponds to a condition when said load current exceeds a safe limit, and
 wherein said gate driver drives said low-side switch to be ON in a second phase of each cycle of said sequence of cycles.

19. The VRM of claim 18, wherein said gate driver receives said periodic clock signal and drives said high-side switch and said low-side switch to an ON condition normally according to the first phase and the second phase of said periodic clock signal respectively, but drives said high-side switch with duration of said first phase equaling said second magnitude upon determination by said over-current management block of said potential over-current condition.

20. The VRM of claim 19, wherein said over-current management block concludes that the potential over-current condition exists if a current flowing through said low-side switch exceeds a first current threshold, or if an OFF-duration of said high-side switch is less than a second threshold duration,
 wherein said first magnitude of duration for said first phase is insufficient to reliably determine presence of said actual overcurrent condition,
 wherein said second magnitude of duration for said first phase is sufficient to reliably determine presence of said actual overcurrent condition,
 wherein duration of said second phase is more than said second magnitude of duration.

\* \* \* \* \*